US012446809B2

United States Patent
Yang et al.

(10) Patent No.: US 12,446,809 B2
(45) Date of Patent: Oct. 21, 2025

(54) IMAGING METHOD AND IMAGING SYSTEM

(71) Applicants: SHENZHEN MINDRAY BIO-MEDICAL ELECTRONICS CO., LTD., Guangdong (CN); SHENZHEN MINDRAY SCIENTIFIC CO., LTD., Guangdong (CN)

(72) Inventors: Fang Yang, Shenzhen (CN); Lei Zhu, Shenzhen (CN)

(73) Assignees: Shenzhen Mindray Bio-Medical Electronics Co., Ltd., Shenzhen (CN); Shenzhen Mindray Scientific Co., Ltd., Shenzhen (CN)

( * ) Notice: Subject to any disclaimer, the term of this patent is extended or adjusted under 35 U.S.C. 154(b) by 320 days.

(21) Appl. No.: 17/237,901

(22) Filed: Apr. 22, 2021

(65) Prior Publication Data
US 2021/0330226 A1    Oct. 28, 2021

Related U.S. Application Data

(63) Continuation of application No. PCT/CN2018/111659, filed on Oct. 24, 2018.

(51) Int. Cl.
*A61B 5/15* (2006.01)
*A61B 5/00* (2006.01)
(Continued)

(52) U.S. Cl.
CPC ...... *A61B 5/150083* (2013.01); *A61B 5/0095* (2013.01); *A61B 8/0891* (2013.01); *A61B 8/461* (2013.01)

(58) Field of Classification Search
CPC ............ A61B 5/150083; A61B 5/0095; A61B 8/0891; A61B 8/461; A61B 8/06; A61B 8/488; A61B 8/4416; A61B 5/00
See application file for complete search history.

(56) References Cited

U.S. PATENT DOCUMENTS

2006/0265022 A1* 11/2006 John ................ A61N 2/006
607/45
2013/0190594 A1    7/2013 Oraevsky et al.
(Continued)

FOREIGN PATENT DOCUMENTS

CN      103415257 A     11/2013
CN      103637808 A     3/2014
(Continued)

OTHER PUBLICATIONS

PCT International Search Report and the Written Opinion mailed Mar. 25, 2019, issued in related International Application No. PCT/CN2018/111659, with partial English translation (9 pages).

*Primary Examiner* — Jonathan Cwern
(74) *Attorney, Agent, or Firm* — Sheppard Mullin Richter & Hampton LLP

(57) ABSTRACT

An imaging method may include: emitting a first laser to a target body and receiving a first photoacoustic signal returned from the target body; determining a first photoacoustic image of the target body according to the first photoacoustic signal; emitting a second laser to the target body and receiving a second photoacoustic signal returned from the target body, wherein a wavelength of the second laser is different from that of the first laser; determining a second photoacoustic image of the target body according to the second photoacoustic signal; and determining a blood oxygen image of the target body according to the first photoacoustic image and the second photoacoustic image, wherein the blood oxygen image comprises parameters
(Continued)

relate to blood vessels of a target tissue and parameters relate to blood vessels within a preset range at a periphery of the target tissue in the target body.

14 Claims, 5 Drawing Sheets

(51) Int. Cl.
*A61B 8/00* (2006.01)
*A61B 8/08* (2006.01)

(56) References Cited

U.S. PATENT DOCUMENTS

| | | | |
|---|---|---|---|
| 2014/0007690 | A1 | 1/2014 | Hirota |
| 2014/0142404 | A1* | 5/2014 | Wang ................ A61B 8/4444 |
| | | | 600/324 |
| 2014/0275880 | A1* | 9/2014 | Verkruijsse ........ A61B 5/14551 |
| | | | 600/323 |
| 2016/0287153 | A1* | 10/2016 | Samec ................ A61B 5/369 |
| 2018/0028261 | A1* | 2/2018 | Chen .................. A61B 8/085 |
| 2018/0228377 | A1* | 8/2018 | Abe .................. A61B 5/14542 |

FOREIGN PATENT DOCUMENTS

| | | |
|---|---|---|
| CN | 104027068 A | 9/2014 |
| CN | 104545811 A | 4/2015 |
| CN | 105769128 A | 7/2016 |

* cited by examiner

IMAGING METHOD AND IMAGING SYSTEM

This application is a continuation application of International Patent Application No. PCT/CN2018/111659, filed with the China National Intellectual Property Administration (CNIPA) on Oct. 24, 2018. The entire content of the above-referenced application is incorporated herein by reference.

TECHNICAL FIELD

The present application relates to the field of medical instruments, and in particular to an imaging method and an imaging system.

BACKGROUND

Photoacoustic imaging (PAI) is a novel biomedical imaging technology. The principle of PAI is based on the photoacoustic effect. When a biological tissue is irradiated by a short-pulse laser, for example, on the order of nanoseconds (ns), substance with strong optical absorption characteristics in the biological tissue, such as blood, will cause a local temperature rise and thermal expansion after absorbing light energy, thereby generating photoacoustic signals and propagating the photoacoustic signals outward. The photoacoustic signals generated by the biological tissue after being irradiated by the short-pulse laser can be detected by an ultrasonic probe. After the photoacoustic signals are detected, a corresponding reconstruction algorithm can be used to reconstruct an absorber, i.e., the position and morphology of the substance with strong optical absorption characteristics. Combining the advantages of optics and ultrasound, photoacoustic imaging has unique advantages for early diagnosis and prognostic evaluation of some major diseases, and is a novel imaging technology with huge clinical and industrial prospects. Limited by the capability of light in penetrating biological tissues, photoacoustic imaging is mainly applied to on some superficial organs. Photoacoustic imaging embodies functional information of a biological body, while conventional ultrasonic imaging reflects structural information of the biological body. An effective combination of the two, i.e., photoacoustic-ultrasonic dual-modality imaging, overcomes the shortcomings of single-modality imaging, and can provide more comprehensive structural and functional information of the tissue.

However, an image obtained by means of photoacoustic-ultrasonic dual-modality imaging provides neither comprehensive functional information of a target tissue, nor a more comprehensive display of same. Therefore, how to display images that more clearly reflect the characteristics of the target tissue has become an urgent problem to be solved.

SUMMARY

The present application provides an imaging method and an imaging system for improving the comprehensiveness of image display.

In a first aspect of an embodiment of the present application, an imaging method is provided, comprising: within a first period, emitting a first laser to a target body; receiving a first photoacoustic signal returned from the target body; determining a first photoacoustic image of the target body according to the first photoacoustic signal; within a second period, emitting a second laser to the target body; receiving a second photoacoustic signal returned from the target body, wherein the wavelength of the second laser is different from that of the first laser; determining a second photoacoustic image of the target body according to the second photoacoustic signal; and determining a blood oxygen image of the target body according to the first photoacoustic image and the second photoacoustic image, wherein the blood oxygen image comprises related parameters of blood vessels of a target tissue and related parameters of blood vessels within a preset range at the periphery of the target tissue in the target body.

In a second aspect of an embodiment of the present application, an imaging system is provided, comprising: a laser device, a probe, a transmitting circuit, a receiving circuit, and a processor, wherein the laser device is configured to generate, within a first period, a first laser for irradiating a target body, the first laser is coupled to the probe through an optical fiber bundle, and the first laser is emitted to the target body through the optical fiber bundle; the receiving circuit is configured to control the probe to receive a first photoacoustic signal returned from the target body; the processor is configured to determine a first photoacoustic image of the target body according to the first photoacoustic signal; the laser device is further configured to generate, within a second period, a second laser for irradiating the target body, the second laser is coupled to the probe through the optical fiber bundle, and the second laser is emitted to the target body through the optical fiber bundle; the receiving circuit is configured to control the probe to receive a second photoacoustic signal returned from the target body; the processor is further configured to determine a second photoacoustic image of the target body according to the second photoacoustic signal; and the processor is further configured to determine a blood oxygen image of the target body according to the first photoacoustic image and the second photoacoustic image, wherein the blood oxygen image comprises related parameters of blood vessels of a target tissue and related parameters of blood vessels within a preset range at the periphery of the target tissue in the target body.

In a third aspect of an embodiment of the present application, a computer-readable storage medium is provided, wherein the computer-readable storage medium stores instructions that, when run on a computer, cause the computer to perform the imaging method provided in the above first aspect.

In the present application, an ultrasonic wave is emitted to a target body, and at least two lasers with different wavelengths, i.e., a first laser and a second laser, are emitted alternately; then, a corresponding first photoacoustic signal and second photoacoustic signal returned from the target body are received; and a first photoacoustic image of the target body is determined according to the first photoacoustic signal, and a second photoacoustic image of the target body is determined according to the second photoacoustic signal. And a blood oxygen image of the target body is obtained through calculation according to the first photoacoustic image and the second photoacoustic image. Generally, the photoacoustic image may comprise functional information of the target body, including related parameters of blood vessels, for example, the position and morphology of the blood vessels, the distribution of blood oxygen, etc. Therefore, the blood oxygen image comprises related parameters of blood vessels of a target tissue and related parameters of blood vessels in a peripheral area of the target tissue in the target body. The blood oxygen image may be used to analyze the target tissue, and can more clearly reflect the characteristics of the target tissue, thereby facilitating an operator in clearly observing the target tissue.

DESCRIPTION OF THE PREFERRED EMBODIMENTS

The present application provides an imaging method and an imaging system for improving the comprehensiveness of image display.

The terms "first", "second", "third", "fourth", etc. (if any) in the description and claims of the present application and the above accompanying drawings are used to distinguish similar objects, and are not necessarily used to describe a specific order or sequence. It should be understood that the terms used as such may be interchangeable where appropriate, such that the embodiments described herein can be implemented in an order other than what is illustrated or described herein. In addition, the terms "comprise" and "have" and any variations thereof are intended to cover non-exclusive inclusion. For example, a process, method, system, product, or device that comprises a series of steps or units is not necessarily limited to those steps or units explicitly listed, but may comprise other steps or units that are not explicitly listed or are inherent to these processes, methods, products, or devices.

Figure 1:
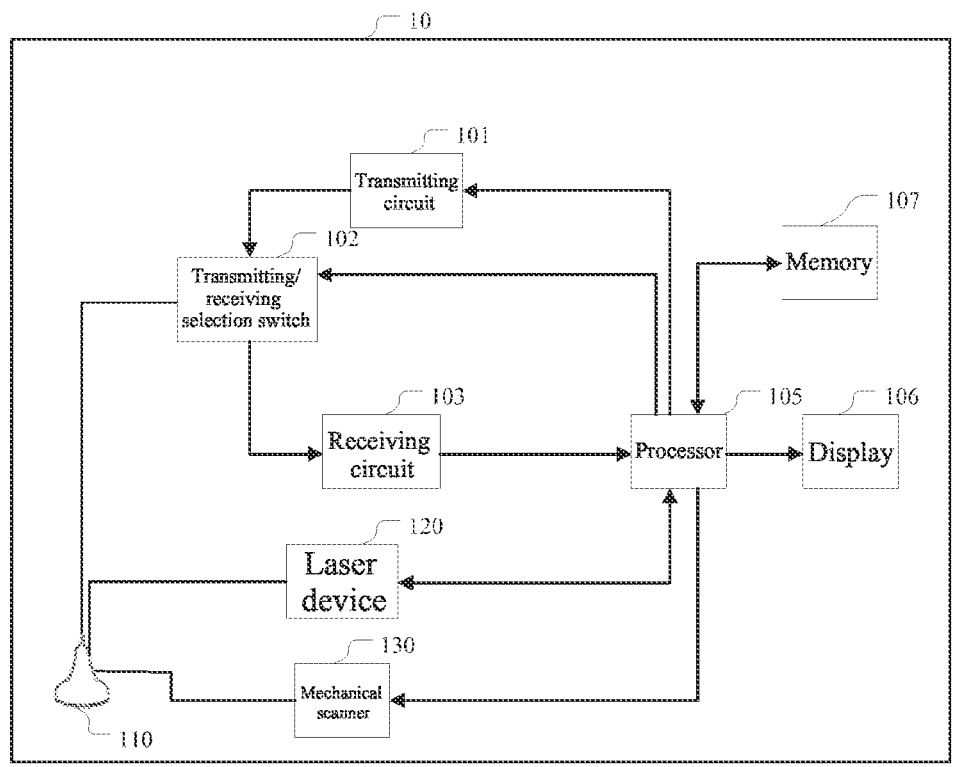
FIG. 1 is a schematic structural block diagram of a possible imaging system provided according to an embodiment of the present application.

FIG. 1 is a schematic structural block diagram of an imaging system 10 according to an embodiment of the present application. The imaging system 10 may comprise a probe 110, a laser device 120, and a mechanical scanner 130, as well as a transmitting circuit 101, a transmitting/receiving selection switch 102, a receiving circuit 103, a processor 105, a display 106, and a memory 107. Of course, the imaging system 10 may further comprise other equipment or devices, etc. not shown in the figure.

The transmitting circuit 101 can excite the probe 110 to emit an ultrasonic wave to a target body. After the probe 110 emits the ultrasonic wave, the receiving circuit 103 can receive, by the probe 110, an ultrasonic echo returned from the target body, so as to obtain an ultrasonic echo signal/data. The ultrasonic echo signal/data is sent to the processor 105 directly or after being subjected to beam synthesis processing by a beam synthesis circuit. The processor 105 processes the ultrasonic echo signal/data to obtain an ultrasonic image of the target body. The ultrasonic image obtained by the processor 105 may be stored in the memory 107. The laser device 120 can generate a laser, which is coupled to the probe through an optical fiber bundle, and is emitted to the target body through the optical fiber bundle coupled onto the probe 110. After the laser is emitted to the target body, the receiving circuit 103 may further receive, by the probe 110, photoacoustic signal/data returned from the target body under the excitation by the laser. The photoacoustic signal/data is, directly or after being processed, sent to the processor 105 for processing so as to obtain a photoacoustic image of the target body. The mechanical scanner 130 may drive the probe 110 to move. The above ultrasonic image and photoacoustic image may be displayed on the display 106.

It should be noted that in the present application, emitting the laser to the target body by the probe 110 specifically refers to emitting the laser to the target body through the optical fiber bundle coupled onto the probe 110. The optical fiber bundle may be arranged outside the probe 110 or inside the probe 110, which may be specifically changed depending on actual scenarios, and is not limited herein.

In one embodiment of the present application, the laser device 120 may be connected to the transmitting/receiving selection switch 102, such that the transmitting/receiving selection switch 102 controls the emission of the laser; alternatively, the laser device 120 may be connected to the probe 110 directly through an optical conduction tool, the optical fiber bundle is coupled onto the probe 110, and the laser is conducted to both sides of the probe 110 by using the optical fiber bundle, so as to irradiate the target body by means of backlighting. In some implementations, the laser device 120 and the optical fiber bundle are both coupled to the interior of the probe, wherein the probe internally further comprises an ultrasonic transducer element for ultrasonic imaging. In this way, the probe can be used not only for conventional ultrasonic imaging, but also for photoacoustic imaging, i.e., a probe integrating ultrasonic imaging and photoacoustic imaging is formed.

The mechanical scanner 130 makes it possible for the probe 110 to receive ultrasonic echo signals/data or photoacoustic signals/data from different positions, and for the processor 105 to process the received ultrasonic echo signals/data or photoacoustic signals/data, so as to obtain an ultrasonic image or a photoacoustic image.

The mechanical scanner 130 is an optional apparatus. In some implementations, the mechanical scanner 130 is coupled into the probe, i.e., the probe integrates the function of mechanical scanning.

In one embodiment of the present application, the mechanical scanner 130 may further comprise a motor controller and a motor, and the motor controller controls a motion trajectory, stroke, or speed, etc. of the motor in the mechanical scanner 130 according to a control signal sent by a processor.

In one embodiment of the present application, the probe 110 may exist independently or may be arranged on the mechanical scanner 130, and the mechanical scanner 130 drives the probe 110 to move.

In one embodiment of the present application, the probe 110 may specifically comprise an ultrasonic transducer. The ultrasonic transducer has functions of transmitting and receiving signals, and can perform various types of imaging, such as grayscale imaging and Doppler flow imaging. Additionally, in some implementations, the optical fiber bundle and the ultrasonic transducer are coupled and then surrounded by a housing to form a probe integrating photoacoustic imaging and ultrasonic imaging functions. That is, under the probe with this structure, the laser device emits a laser, which is then irradiated onto the target body by the probe, and a photoacoustic signal formed under the excitation of the laser and returned from the target body is received by the probe. Of course, the probe may further be used for conventional ultrasonic imaging, i.e., emitting an ultrasonic wave to the target body and receiving an ultrasonic echo returned from the target body. Of course, the laser device may further be directly coupled to the ultrasonic transducer and then fully or partially surrounded by the housing, so as to form a probe integrating photoacoustic imaging and ultrasonic imaging functions. The probe can be used for both photoacoustic imaging and ultrasonic imaging.

In one embodiment of the present application, the foregoing display 106 may be a touch display screen, a liquid crystal display screen, etc., which is built in the imaging system, or may be an independent display device, such as a liquid crystal display and a television, independent of the imaging system, or may be a display on an electronic device, such as a mobile phone and a tablet computer, etc.

In one embodiment of the present application, the foregoing memory 107 may be a flash memory card, a solid state memory, a hard disk, etc.

In one embodiment of the present application, a computer-readable storage medium is further provided, wherein the computer-readable storage medium stores a plurality of program instructions, and after the plurality of program instructions are invoked and executed by the processor 105, some or all of the steps in the ultrasonic imaging method in the embodiments of the present application or any combination of the steps can be performed.

In one embodiment of the present application, the computer-readable storage medium may be the memory 107, which may be a non-volatile storage medium, such as a flash memory card, a solid state memory, and a hard disk.

In one embodiment of the present application, the foregoing processor 105 may be implemented by software, hardware, firmware, or a combination thereof, and may use circuits, single or a plurality of application specific integrated circuits (ASIC), single or a plurality of universal integrated circuits, single or a plurality of microprocessors, single or a plurality of programmable logic devices, or a combination of the foregoing circuits or devices, or other suitable circuits or devices, such that the processor 105 can perform the corresponding steps of the imaging method in the embodiments of the present application.

The imaging method in the present application will be described in detail below based on the foregoing imaging system.

Figure 2:
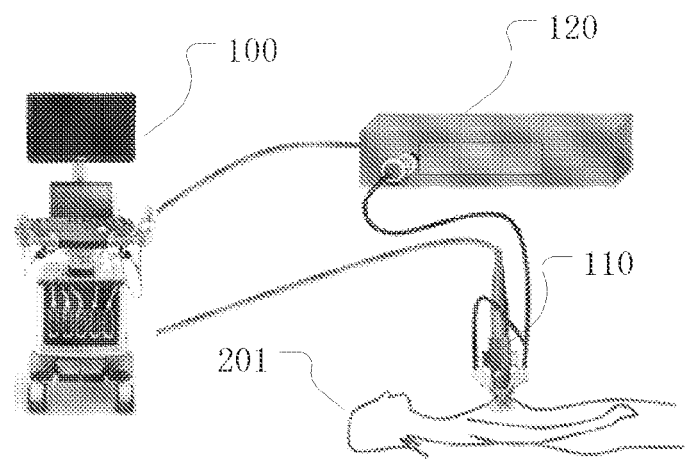
FIG. 2 is a schematic diagram of an application scenario of a possible ultrasonic imaging method provided according to an embodiment of the present application.

It should be noted that, in conjunction with the schematic structural block diagram of the imaging system shown in FIG. 1, the imaging method provided in the embodiment of the present application may be applied to the following application scenarios: Exemplarily, reference may be made to FIG. 2 for specific application scenarios. An operator scans the target body 201 by using the probe 110. Lasers are emitted from the optical fiber bundle at either side of the probe 110, and a returned photoacoustic signal is received by the probe 110. Moreover, the probe emits an ultrasonic wave, and the probe 110 receives an ultrasonic echo signal. The laser and the ultrasonic wave are not sent simultaneously. The operator can see the tissue structure, etc. through the display 106.

Figure 3:
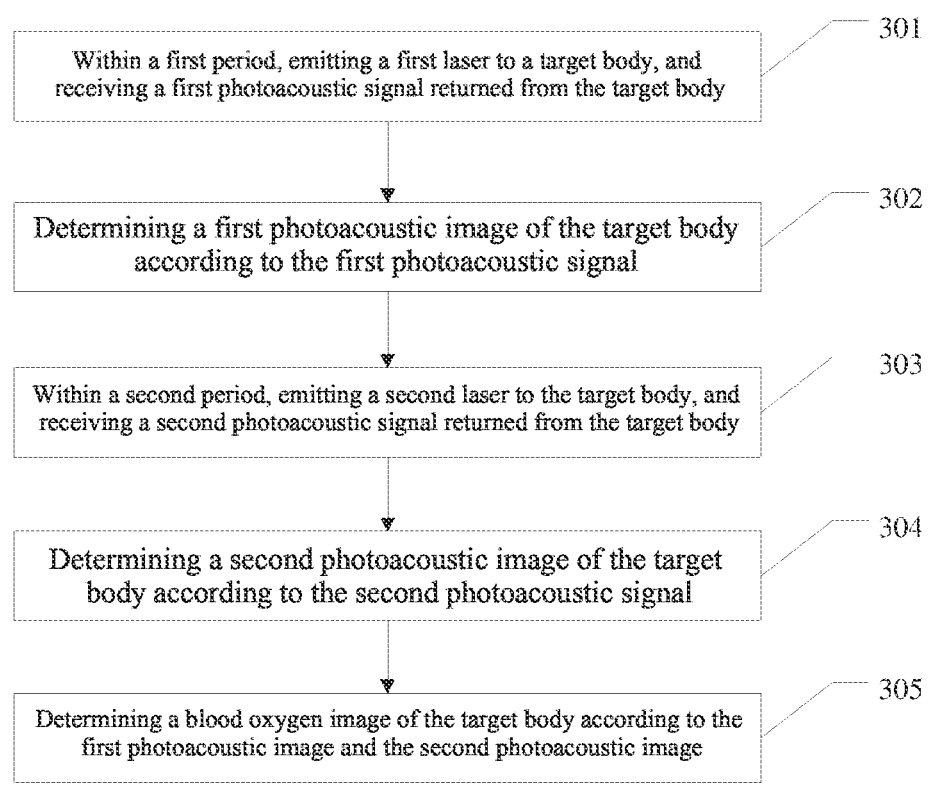
FIG. 3 is a flow chart of a possible imaging method provided according to an embodiment of the present application.

Based on this, reference is made to FIG. 3, which shows an imaging method provided in the embodiment of the present application. The imaging method can be applied to the foregoing imaging system shown in FIG. 1, and the embodiment of the imaging method comprises:

301. Within a first period, a first laser is emitted to a target body, and a first photoacoustic signal returned from the target body is received.

Within the first period, through an optical fiber bundle coupled onto the probe 110, the first laser may be emitted to the target body, and the first photoacoustic signal generated by the target body under the excitation by the first laser may be received. The received first photoacoustic signal may vary depending on the target body.

Specifically, the first laser is coupled to the probe through the optical fiber bundle, and then emitted to the target body through the optical fiber bundle coupled onto the probe. After a tissue in the target body absorbs light energy, it will cause a temperature rise and thermal expansion, thereby generating a photoacoustic signal and propagating the photoacoustic signal outward, and the probe 110 detects the corresponding first photoacoustic signal.

In one embodiment of the present application, the first laser may be generated after the processor 105 sends a first control signal to the laser device 120, wherein the first control signal may comprise a wavelength, frequency, or timing, etc. of the first laser. The first laser is coupled to the probe 110 through the optical fiber bundle, and the laser is emitted to the target body through the optical fiber bundle. The position and angle at which the laser is emitted can be controlled by controlling the movement of the probe. After a tissue in the target body absorbs light energy, it will cause a temperature rise and thermal expansion, thereby generating a photoacoustic signal and propagating the photoacoustic signal outward, and the probe 110 detects the corresponding photoacoustic signal. Generally, after the laser device 120 generates the first laser, feedback information can be returned to the processor 105. The feedback information may comprise a time at which the first laser is actually sent. The processor 105 can calculate, according to a preset algorithm, an interval duration of receiving photoacoustic signals, and the receiving circuit 103 is used to control the probe 110 to receive the first photoacoustic signal returned from the target body.

302. A first photoacoustic image of the target body is determined according to the first photoacoustic signal.

After the first photoacoustic signal is obtained, it is the first photoacoustic signal that may be subjected to noise removal, and processing, such as beam synthesis and image reconstruction, such that the first photoacoustic image of the target body is obtained.

303. Within a second period, a second laser is emitted to the target body, and a second photoacoustic signal returned from the target body is received.

After the first period during which the first laser is emitted, within the second period, through an optical fiber bundle coupled onto the probe 110, the second laser may be emitted to the target body, and the second photoacoustic signal generated by the target body under the excitation by the second laser may be received. The received second photoacoustic signal may vary depending on the target body.

The wavelength of the first laser is different from that of the second laser. For example, the first laser has a short wavelength, and the second laser has a long wavelength. Moreover, there is no overlap between the first period and the second period. Moreover, the order of emitting the first laser and emitting the second laser is not limited in the embodiment of the present application. The first laser may be emitted first, or the second laser may be emitted first, which may be specifically changed depending on actual application scenarios.

The specific steps of emitting the second laser and receiving the second photoacoustic signal are similar to the steps of emitting the first laser and receiving the second photoacoustic signal in step 301 described above, which will not be repeated in detail herein.

304. A second photoacoustic image of the target body is determined according to the second photoacoustic signal.

After the second photoacoustic signal is received, the second photoacoustic image of the target body can be obtained according to the second photoacoustic signal. The process of obtaining the second photoacoustic image according to the second photoacoustic signal is similar to the step of obtaining the first photoacoustic image according to the first photoacoustic signal in step 302 described above, which will not be repeated in detail herein.

It should be noted that the order of acquiring the first photoacoustic image and the second photoacoustic image is not limited in the present application. Step 302 may be performed first, or step 304 may be performed first, which may be specifically changed depending on actual application scenarios.

305. A blood oxygen image of the target body is determined according to the first photoacoustic image and the second photoacoustic image.

After the first photoacoustic image and the second photoacoustic image are obtained, related parameters of blood vessels related to the target body, such as the position and morphology of the blood vessels and blood oxygen saturation, can be determined according to parameters included in the first photoacoustic image and the second photoacoustic image, and the blood oxygen image of the target body can be generated according to the related parameters of the blood vessels.

It should be noted that in addition to that the blood oxygen image of the target body can be determined through the photoacoustic image obtained under the two lasers, namely the first laser and the second laser, the blood oxygen image of the target body can also be determined through the photoacoustic image obtained under more lasers. In the present application, the process of determining the blood oxygen image is explained by taking only two lasers as an example, which may be specifically changed depending on actual needs, and is not limited in the present application.

In the embodiment of the present application, the blood oxygen image of the target body may be obtained through calculation according to the first photoacoustic image and the second photoacoustic image. Generally, the photoacoustic image may comprise functional information of the target body, including related parameters of blood vessels, for example, the position and morphology of the blood vessels, the distribution of blood oxygen, etc. Therefore, the blood oxygen image comprises related parameters of blood vessels of a target tissue and related parameters of blood vessels in a peripheral area of the target tissue in the target body. The blood oxygen image may be used to analyze the target tissue, and can more clearly reflect the characteristics of the target tissue, thereby facilitating an operator in clearly observing the target tissue.

Figure 4:
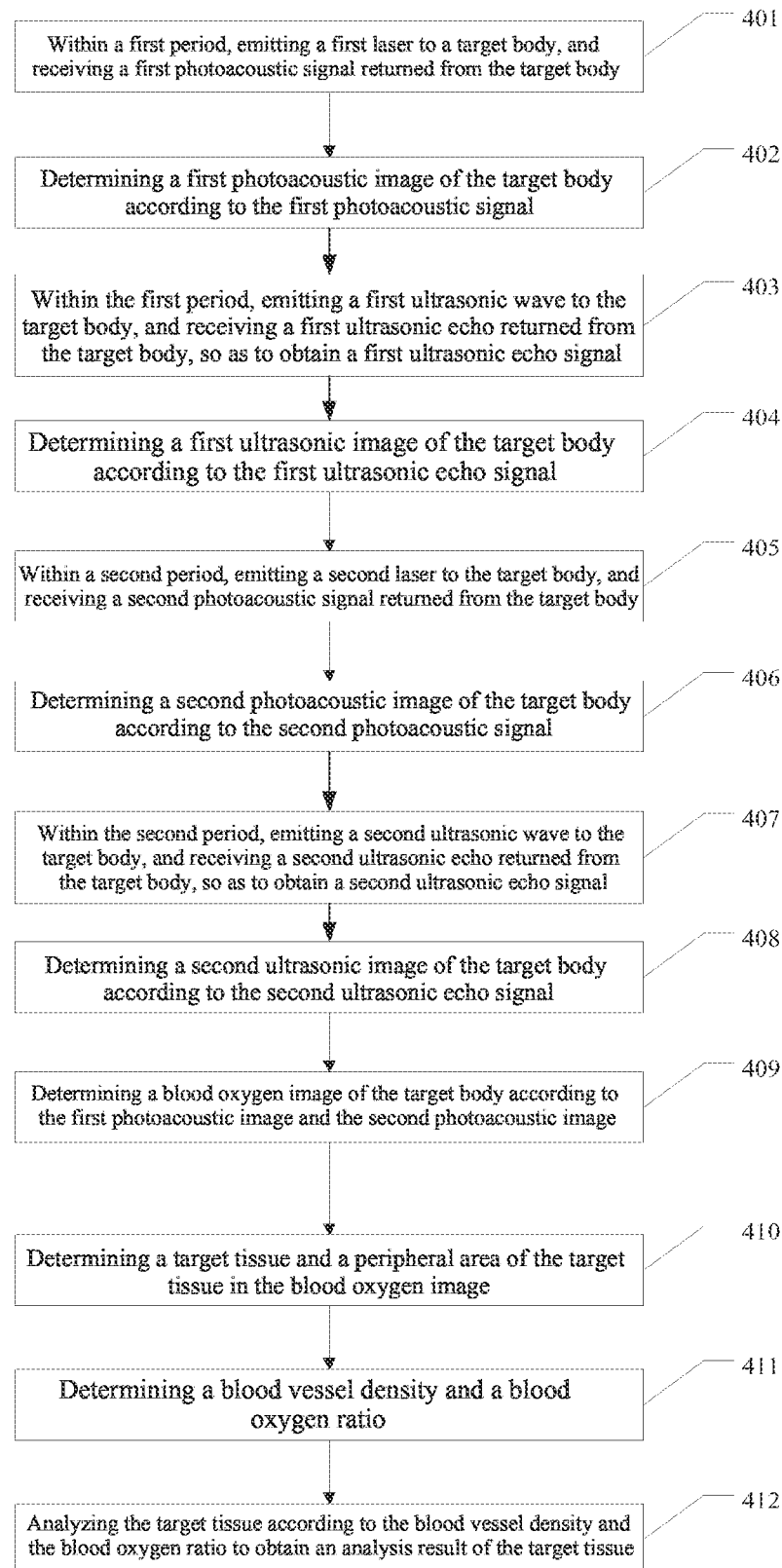
FIG. 4 is a flow chart of another possible imaging method provided according to an embodiment of the present application.

Still further, a specific process of an imaging method provided in an embodiment of the present application will be described in more detail below. With reference to FIG. 4, the embodiment of the imaging method may comprise the specific steps as follows:

401. Within a first period, a first laser is emitted to a target body, and a first photoacoustic signal returned from the target body is received.

Similar to step 301 described above, in this step, the first laser is generated by the laser device 130 and coupled to the probe 110 through an optical fiber bundle. The first laser can be emitted to the target body through the optical fiber bundle by controlling the position, angle, etc. of the probe 110. After a tissue in the target body absorbs light energy, it will cause a temperature rise and thermal expansion, thereby generating a photoacoustic signal and propagating the photoacoustic signal outward, and the probe 110 detects the corresponding first photoacoustic signal.

In one embodiment of the present application, the optical fiber bundle is coupled onto the probe, and the laser is conducted to both sides of the probe 110 by using the optical fiber bundle, so as to irradiate the target body by means of backlighting. Moreover, the probe 110 comprises an ultrasonic transducer, which has the functions of transmitting and receiving signals. On the basis of ensuring the conventional ultrasonic imaging and Doppler flow imaging, the ultrasonic transducer also has a large frequency bandwidth and high sensitivity, improves the capability of detecting photoacoustic signals, and can even detect weak signals.

In one embodiment of the present application, the first laser is sent to the target body through the optical fiber bundle coupled onto the probe 110. The probe 110 may be arranged on the mechanical scanner 130, and then the processor 105 can send a control signal to the mechanical scanner 130 to control the motor in the mechanical scanner 130, so as to control the scanning speed, trajectory, etc. of the mechanical scanner 130. The probe 110 may, around the target body and from different angles, receive the first photoacoustic signals returned from the target body, and perform photoacoustic imaging of the target body from different angles, such that a plurality of frames of first photoacoustic images can be formed to make the first photoacoustic image of the target body more stereoscopic.

Figure 5:
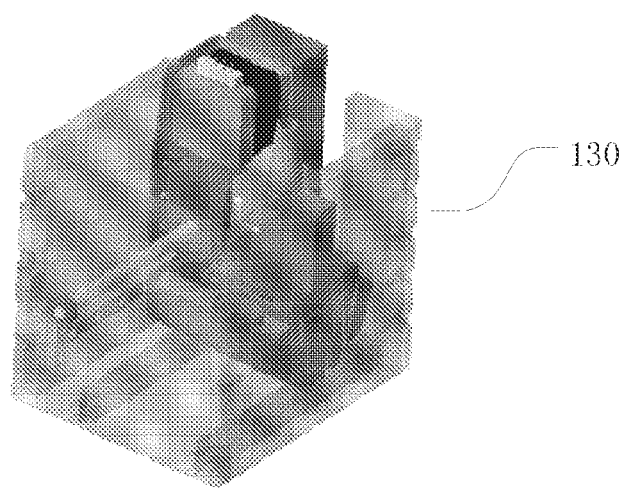
FIG. 5 is a schematic diagram of a possible mechanical scanner provided according to an embodiment of the present application.

Exemplarily, the mechanical scanner 130 may be as shown in FIG. 5.

402. A first photoacoustic image of the target body is determined according to the first photoacoustic signal.

Similar to step 302 described above, in this step, after the first photoacoustic signal is obtained, the first photoacoustic image is obtained according to the first photoacoustic signal.

In one embodiment of the present application, after the first photoacoustic image is obtained, the first photoacoustic image may be displayed on the display 106.

In one embodiment of the present application, when the mechanical scanner 130 drives the probe 110 to move, a plurality of first photoacoustic signals can be acquired from a plurality of different angles, and a plurality of frames of photoacoustic images can be obtained according to the plurality of photoacoustic signals; then, the plurality of frames of photoacoustic images can be synthesized to form a first photoacoustic image in three dimensions, such that the obtained first photoacoustic image can be displayed more stereoscopically, and an operator can observe the situation of the target body more intuitively through the first photoacoustic image.

403. Within the first period, a first ultrasonic wave is emitted to the target body, and a first ultrasonic echo returned from the target body is received to obtain a first ultrasonic echo signal.

In addition, within the first period, the probe 110 also emits the first ultrasonic wave to the target body, and the probe 110 receives the corresponding first ultrasonic echo returned from the target body, and the first ultrasonic echo is converted into the first ultrasonic echo signal. The received ultrasonic echo signal may vary depending on the target tissue.

It should be noted that the first laser and the first ultrasonic wave are not sent simultaneously. The first laser may be emitted first, or the first ultrasonic wave may be sent first; step 401 may be performed first, or step 402 may be performed first, which may be specifically changed depending on actual application scenarios, and is not limited herein.

Figure 6:
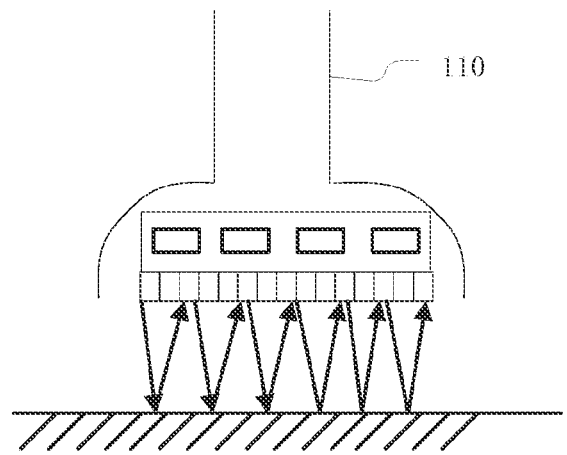
FIG. 6 is a schematic diagram of a possible probe provided according to an embodiment of the present application.

In one embodiment of the present application, as shown in FIG. 6, specifically, the processor 105 may control the turning-on of the transmitting/receiving selection switch 102, and control the transmitting circuit 101 to emit an ultrasonic wave to the target body by the probe 110, and an ultrasonic echo is received and transmitted to the receiving circuit 103 by the probe 110, i.e., it can be understood that the receiving circuit 103 can receive, by the probe 110, the ultrasonic echo returned from the target body, so as to obtain the ultrasonic echo signal.

In one embodiment of the present application, an ultrasonic wave is sent by the probe 110. The probe 110 may be arranged on the mechanical scanner 130, and then the processor 105 can send a control signal to the mechanical scanner 130 to control the motor in the mechanical scanner 130, so as to control the scanning speed, trajectory, etc. of the mechanical scanner 130, such that the probe 110 may, around the target body, send the ultrasonic wave from different angles, and receive the ultrasonic echo from different angles, so as to perform ultrasonic imaging of the target body from different angles.

404. A first ultrasonic image of the target body is determined according to the first ultrasonic echo signal.

Specifically, after the ultrasonic echo signal is received, it is the ultrasonic signal that may be subjected to noise removal. Then, the ultrasonic echo signal is subjected to beam synthesis processing by the beam synthesis circuit and then transmitted to the processor 105 for processing by the processor 105, such that an ultrasonic image of the target body is obtained. After the photoacoustic signal is acquired, it is also the photoacoustic signal that may be subjected to noise removal and image reconstruction processing, such as beam synthesis processing, such that a photoacoustic image of the target body is obtained. Generally, the ultrasonic image is a grayscale image, which can embody structural information of the target tissue in the target body, and the photoacoustic image can embody functional information of the tissue in the target body.

In one embodiment of the present application, after the first ultrasonic image and the first photoacoustic image are obtained, the first ultrasonic image and the second photoacoustic image are fused to obtain a first fused image, which is then displayed on the display 106. Specifically, it is possible that on the basis of the first ultrasonic image, pixel values of all pixel points in the first photoacoustic image are superimposed on those of the corresponding pixel points in the first ultrasonic image. Of course, it is also possible that on the basis of the first photoacoustic image, pixel values of all pixel points in the first ultrasonic image are superimposed on those of the corresponding pixel points in the first photoacoustic image. It is also possible that an operator chooses to specifically superimpose pixel values of pixel points in one of the first ultrasonic image or the first photoacoustic image on the other one thereof, which may be specifically changed depending on actual application scenarios, and is not limited herein. The first fused image may comprise both structural information of the target body displayed in the first ultrasonic image, and functional information of the target body displayed in the first photoacoustic image, such that the operator can carry out a more comprehensive observation of the target body.

In one embodiment of the present application, if the probe 110 is arranged on the mechanical scanner 130 for moving, ultrasonic echo signals and photoacoustic signals can be obtained from a plurality of different angles, and then a plurality of frames of corresponding ultrasonic images and photoacoustic images can also be obtained. Generally, the projection direction and angle of light can be changed, or the transparency of object display can be adjusted to provide a comprehensive display of the 3D structure of the target tissue, such that the operator can carry out certain observations through the ultrasonic images and the photoacoustic images.

Generally, Doppler frequency shift can be used to implement Doppler flow imaging, and can image blood flow having a certain flow rate. However, Doppler flow imaging is so sensitive to motion, including tissue motion and probe motion, that it is difficult to implement three-dimensional Doppler imaging using a mechanical scanner. In the process of the mechanical scanner performing scanning with the probe being put in motion, artifacts may be introduced due to motion. However, photoacoustic imaging relies on the photoacoustic signal generated by the absorption of the laser by the tissue at a specified wavelength, and thus it is not sensitive to the motion of the tissue or the probe. Therefore, the present application makes it possible to use the mechanical scanner to acquire the photoacoustic image and the ultrasonic image of the target body, thereby displaying the collection of the functional information of the target body through the photoacoustic image, and realize the collection of the structural information of the target body through the ultrasonic image. Therefore, 3D acquisition of the functional and structural information of the tissue body can also be implemented without Doppler flow imaging.

405. Within a second period, a second laser is emitted to the target body, and a second photoacoustic signal returned from the target body is received.

Similar to step 401 described above, in this step, within the second period, the second laser is emitted to the target body through the optical fiber bundle coupled onto the probe 110, and the second photoacoustic signal returned from the target body is received by the probe 110.

406. A second photoacoustic image of the target body is determined according to the second photoacoustic signal.

It should be noted that step 405 and step 406 in the embodiment of the present application are similar to step 401 and step 402 described above, which will not be repeated in detail herein.

In addition, the specific operation steps of emitting the first laser to the target body and emitting the second laser to the target body may be the same, and the steps of acquiring the first photoacoustic image and acquiring the second photoacoustic image may also remain the same. For example, the angle at which the first photoacoustic signal is received and the angle at which the second photoacoustic signal is received may remain the same, and the specific process of processing the first photoacoustic signal to obtain the first photoacoustic image and the specific process of processing the second photoacoustic signal to obtain the second photoacoustic image may remain the same.

Similarly, in one embodiment of the present application, when the mechanical scanner 130 drives the probe 110 to move, a plurality of second photoacoustic signals can be acquired from a plurality of different angles, and a plurality of frames of photoacoustic images can be obtained based on the plurality of second photoacoustic signals; then, the plurality of frames of photoacoustic images can be synthesized to form a second photoacoustic image in three dimensions, such that the obtained second photoacoustic image can be displayed more stereoscopically, and an operator can observe the situation of the target body more intuitively through the first photoacoustic image. In addition, when the blood oxygen image is obtained through calculation, a three-dimensional blood oxygen image can be obtained through calculation according to the three-dimensional first photoacoustic image and second photoacoustic image, such that the operator can carry out a more comprehensive observation of the relevant situation of blood vessels of the target body.

407. Within the second period, a second ultrasonic wave is emitted to the target body, and a second ultrasonic echo returned from the target body is received to obtain a second ultrasonic echo signal.

Within the second period, the probe 110 also sends the second ultrasonic wave to the target body, and receives the second ultrasonic echo returned from the target body, and the second ultrasonic echo is converted into the second ultrasonic echo signal.

The second ultrasonic wave and the second laser are sent at different times, i.e., the second ultrasonic wave and the second laser are not sent simultaneously. The second ultrasonic wave may be sent first, or the second laser may be emitted first, which may be specifically changed depending on actual application scenarios.

408. A second ultrasonic image of the target body is determined according to the second ultrasonic echo signal.

After the second ultrasonic echo signal is received, the specific process of obtaining the second ultrasonic image of the target body according to the second ultrasonic echo signal is similar to the process of obtaining the first ultrasonic image according to the first ultrasonic echo signal in step 404 described above, which will not be repeated in detail herein.

In one embodiment of the present application, in addition to displaying the first fused image, it is also possible to fuse, after a second ultrasonic image and a second photoacoustic image are obtained, the second ultrasonic image and the second photoacoustic image to obtain a second fused image, and display the second fused image on the display 106. The first fused image and the second fused image may be displayed on one screen simultaneously, or one of the two may be displayed, or the operator may choose to display one of the first fused image and the second fused image. Specifically, it is possible that on the basis of the second ultrasonic image, pixel values of all pixel points in the second photoacoustic image are superimposed on those of the corresponding pixel points in the second ultrasonic image. It is also possible that on the basis of the second photoacoustic image, pixel values of all pixel points in the second ultrasonic image are superimposed on those of the corresponding pixel points in the second photoacoustic image. It is also possible that an operator chooses to specifically superimpose pixel values of pixel points in one of the second ultrasonic image or the second photoacoustic image on the other one thereof, which may be specifically changed depending on actual application scenarios, and is not limited herein. Similar to the above first fused image, the second fused image may comprise both structural information of the target body displayed in the second ultrasonic image, and functional information of the target body displayed in the second photoacoustic image, such that the operator can carry out a more comprehensive observation of the target body.

It should be noted that in the embodiment of the present application, the first ultrasonic image and the first photoacoustic image may be acquired first, or the second ultrasonic image and the second photoacoustic image may be acquired first, which may be specifically changed depending on actual application scenarios.

409. A blood oxygen image of the target body is determined according to the first photoacoustic image and the second photoacoustic image.

After the first photoacoustic image and the second photoacoustic image are obtained, the blood oxygen saturation of all pixel points corresponding to the target body may be calculated according to the first photoacoustic image and the second photoacoustic image, so as to obtain the blood oxygen image, which is then displayed on the display 106.

Specifically, the blood oxygen saturation of all pixel points may be calculated according to a preset formula, and the preset formula may comprise:

$$Hb = \frac{(\varepsilon_{HbO2}^2 A1 - \varepsilon_{HbO2}^1 A2)}{\varepsilon_{Hb}^1 \varepsilon_{HbO2}^2 - \varepsilon_{Hb}^2 \varepsilon_{HbO2}^1},$$

$$HbO2 = \frac{(\varepsilon_{Hb}^1 A2 - \varepsilon_{HbO2}^2 A1)}{\varepsilon_{Hb}^1 \varepsilon_{HbO2}^2 - \varepsilon_{Hb}^2 \varepsilon_{HbO2}^1},$$

$$SO2 = \frac{HbO2}{Hb + HbO2} * 100 = \frac{\varepsilon_{Hb}^1 A2 - \varepsilon_{HbO2}^2 A1}{A1(\varepsilon_{HbO2}^2 - \varepsilon_{Hb}^2) + A2(\varepsilon_{Hb}^1 - \varepsilon_{HbO2}^1)} * 100.$$

A1 is related data of the first laser, and A2 is related data of the second laser. The related data of the first laser may be an amplitude of the corresponding pixel point in the first photoacoustic signal, or an amplitude received by an ultrasonic array probe in any one of a plurality of channels, or a value obtained after beam synthesis processing is performed on the amplitude received in each of the plurality of channels, etc. The related data of the second laser may be an amplitude of the corresponding pixel point in the second photoacoustic signal, or an amplitude received by an ultrasonic array probe in any one of a plurality of channels, or a value obtained after beam synthesis processing is performed on the amplitude received in each of the plurality of channels, etc.

$\varepsilon_{Hb}^1$ is a preset extinction coefficient of deoxygenated hemoglobin corresponding to the preset first laser, and $\varepsilon_{HbO2}^1$ is a preset extinction coefficient of oxygenated hemoglobin corresponding to the first laser. $\varepsilon_{Hb}^2$ is a preset extinction coefficient of deoxygenated hemoglobin corresponding to the second laser, and $\varepsilon_{HbO2}^2$ is a preset extinction coefficient of oxygenated hemoglobin corresponding to the second laser. Hb is the content of deoxygenated hemoglobin in a target pixel point, HbO2 is the content of oxygenated hemoglobin in the target pixel point, and SO2 is the blood oxygen saturation of the target pixel point, with the target pixel point being any one of all the pixel points.

According to the above formula, the blood oxygen saturation of all the pixel points of the target body can be calculated. Then, the values of blood oxygen saturation of all the pixel points are used as the pixel values of the corresponding pixel points, or the values of blood oxygen saturation of all the pixel points are calculated according to a preset algorithm to obtain the pixel values of the corresponding pixel points, and the blood oxygen image of the target body can then be obtained according to the pixel values of all the pixel points.

In one embodiment of the present application, after the first ultrasonic image, the second ultrasonic image, the first fused image, the second fused image and the blood oxygen image are obtained, one of the first ultrasonic image or second ultrasonic image, the first fused image, the second fused image and the blood oxygen image may be displayed on the same screen simultaneously, such that the operator can observe the target body based on the combination of the ultrasonic image, the first fused image, the second fused image and the blood oxygen image, and thus have a more comprehensive observation of the target body.

410. The target tissue and a peripheral area of the target tissue are determined in the blood oxygen image.

After the blood oxygen image is obtained, the target tissue and the peripheral area of the target tissue are determined in the blood oxygen image.

Before that, it is necessary to determine the target tissue in the first ultrasonic image or the second ultrasonic image. The specific process of determining the target tissue in the ultrasonic image may be:

determining the target tissue by comparing parameter values of the target tissue and of other tissues around the target tissue in the ultrasonic image. The parameter values may comprise at least one of a grayscale value, a brightness value, a pixel value, or a gradient value. Of course, in addition to the above grayscale value, brightness value, pixel value or gradient value, the parameter values may be other values that can be used for image comparison, which may be specifically changed depending on actual applications, and is not limited herein. Alternatively, the target tissue may be manually selected and determined by the operator in the ultrasonic image. The processor 105 receives an input parameter for the ultrasonic image, and a boundary of the target tissue is determined according to the input parameter. For example, any one of the first ultrasonic image or the second ultrasonic image may be displayed on the display 106, and the operator selects, through an input device, the boundary of the target tissue in the ultrasonic image to generate an input parameter. Therefore, even if the contrast between the target tissue and the normal tissue around the target tissue is not significant, the operator may manually delineate the target tissue to obtain more accurate structural information of the target tissue in the ultrasonic image.

In one embodiment of the present application, when there are a plurality of frames of first ultrasonic images and a plurality of frames of second ultrasonic images, the plurality of frames of first ultrasonic images or the plurality of frames of second ultrasonic images may be fused and displayed as a 3D ultrasonic image, and then the operator makes a manual selection in the 3D ultrasonic image to determine the target tissue in the ultrasonic image.

After the target tissue is determined in any one of the first ultrasonic image or the second ultrasonic image, it is also necessary to determine the target tissue in the blood oxygen image. Specifically, the angle and resolution of the blood oxygen image may be adjusted to be the same as the angle and resolution of any of the ultrasonic images. After the target tissue is determined in any of the ultrasonic images, position information of all the pixel points of the target tissue that are included in the ultrasonic image can be determined, and then the corresponding positions of all the pixel points are determined in the blood oxygen image according to the position information of all the pixel points, so as to determine the target tissue in the blood oxygen image.

Figure 7:
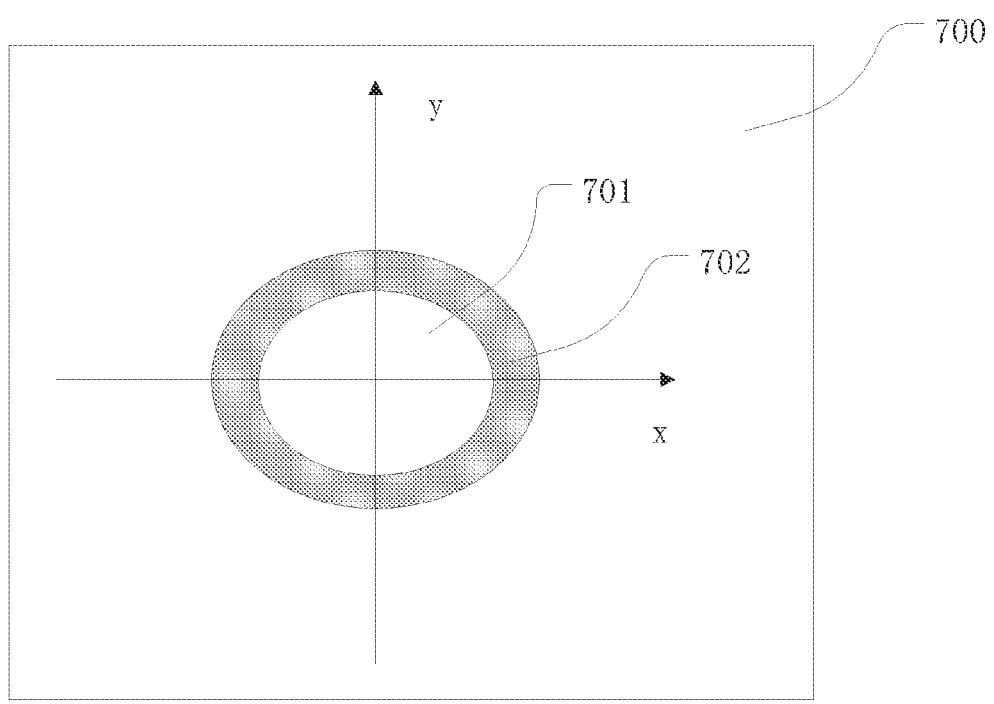
FIG. 7 is a schematic diagram of a range of a peripheral area of a possible target tissue provided according to an embodiment of the present application.

After the target tissue is determined in the blood oxygen image, it is then determined that a preset range at the periphery of the target tissue is the peripheral area of the target tissue. In one embodiment of the present application, after the target tissue is determined in the blood oxygen image, a coordinate axis can be established, and then each semi-axis of the target tissue is extended to n times, where n>1.0, and the area where the target tissue is located is removed, so as to obtain the peripheral area of the target tissue. Exemplarily, taking a two-dimensional coordinate axis as an example, as shown in FIG. 7, after a blood oxygen image 700 is obtained and a target tissue 701 is determined in the blood oxygen image 700, a two-dimensional coordinate axis is established in the blood oxygen image, each semi-axis of the target tissue is magnified by a factor of n, and then the area left after the removal of the target tissue, i.e., 701 shown in FIG. 7, is the peripheral area of the target tissue. It should be understood that in the embodiment of the present application, only a two-dimensional coordinate axis is taken as an example for illustration. When the obtained blood oxygen image is a three-dimensional image, a three-dimensional coordinate axis may also be established to determine the peripheral area of the target tissue, which may be specifically changed depending on actual application scenarios, and is not limited in the present application.

411. A blood vessel density and a blood oxygen ratio are determined.

After the target tissue and the peripheral area of the target tissue are determined in the blood oxygen image, the blood vessel density and blood oxygen ratio of the target tissue and the peripheral area of the target tissue can be calculated. The blood vessel density is the ratio of the volume of blood vessels to the volume of the tissue. The blood oxygen ratio is the ratio of the mean value of blood oxygen saturation of the target tissue to the mean value of blood oxygen saturation of the peripheral area of the target tissue.

Specifically, in one embodiment of the present application, the specific method for calculating the blood oxygen ratio may involve: calculating a first mean value of blood oxygen saturation of the target tissue and a second mean value of blood oxygen saturation of the peripheral area of the target tissue in the blood oxygen image, and then calculating the ratio of the first mean value of blood oxygen saturation to the second mean value of blood oxygen saturation. The specific method for calculating the first mean value of blood oxygen saturation of the target tissue may involve: determining, according to pixel values of all pixel points in the blood oxygen image, values of blood oxygen saturation of all the pixel points; then, summing the values of blood oxygen saturation corresponding to all the pixel points in the target tissue in the blood oxygen image to obtain a total value of blood oxygen saturation; and then, averaging all the pixel points in the target tissue by using the total value of blood oxygen saturation to obtain, through calculation, the first mean value of blood oxygen saturation of the target tissue. It can be understood that, after the total value of blood oxygen saturation of all the pixel points in the target tissue is obtained through calculation, the total value is divided by the number of pixel points in the target tissue to obtain an averaged mean value of blood oxygen saturation of all the pixel points in the target tissue, i.e., the first mean value of blood oxygen saturation. Similarly, the specific method for calculating the second mean value of blood oxygen saturation of the peripheral area of the target tissue may involve:

determining, according to pixel values of all pixel points in the blood oxygen image, values of blood oxygen saturation of all the pixel points; then, summing the values of blood oxygen saturation corresponding to all the pixel points in the peripheral area of the target tissue in the blood oxygen image to obtain a total value of blood oxygen saturation; and then, averaging all the pixel points in the peripheral area of the target tissue by using the total value of blood oxygen saturation to obtain, through calculation, the first mean value of blood oxygen saturation of the target tissue. It can be understood that, after the total value of blood oxygen saturation of all the pixel points in the peripheral area of the target tissue is obtain through calculation, the total value is divided by the number of pixel points in the peripheral area of the target tissue to obtain an averaged mean value of blood oxygen saturation of all the pixel points in the peripheral area of the target tissue, i.e., the second mean value of blood oxygen saturation.

Specifically, in one embodiment of the present application, the specific method for calculating the blood vessel density may involve: determining, from all the pixel points and in the blood oxygen image, pixel point having a blood oxygen saturation greater than a threshold value to be pixel points of the blood vessels; then, calculating the number of the pixel points of the blood vessels and the number of the pixel points in the blood oxygen image, and calculating the ratio of the number of the pixel points of the blood vessels to the number of the pixel points in the blood oxygen image, so as to obtain the blood vessel density. It can be understood that, a part of the blood oxygen image that has a blood oxygen saturation greater than a threshold value is determined to be a blood part; then, the number of pixel points in the part that has a blood oxygen saturation greater than a threshold value and the number of the pixel points in the blood oxygen image are calculated; and the ratio of the number of the pixel points in the part that has a blood oxygen saturation greater than a threshold value to the number of the pixel points in the blood oxygen image is calculated to obtain the blood vessel density. In addition, when only part of the blood oxygen image shows the target body, it is also possible to calculate the ratio of the number of the pixel points in the part that has a blood oxygen saturation greater than a threshold value to the number of pixel points in the part of the blood oxygen image, so as to obtain the blood vessel density. In some possible implementations, it is also possible to calculate the blood vessel density in the target tissue, i.e., it is determined by the ratio of the number of the pixel points in the part in the target tissue that has a blood oxygen saturation greater than a threshold value to the number of all the pixel points in the target tissue. Of course, it is also possible to determine the blood vessel density by using the volume ratio. For example, the blood vessel density in the target tissue is determined by using the volume corresponding to the blood vessels in the target tissue and the volume of the target tissue.

In one embodiment of the present application, after the blood vessel density and the blood oxygen ratio are obtained through calculation, the blood vessel density and the blood oxygen ratio may be displayed on the display 106, such that the operator can make a comparison and analysis of the target tissue in the target body with reference to the blood vessel density and the blood oxygen ratio.

412. The target tissue is analyzed according to the blood vessel density and the blood oxygen ratio to obtain an analysis result of the target tissue.

After the blood vessel density and the blood oxygen ratio are obtained, the target tissue can be analyzed with reference to the blood vessel density and the blood oxygen ratio. For example, it is possible to compare a blood oxygen ratio range of a conventional tissue with the blood oxygen ratio of the target body, and display a comparison result on the display 106. It is also possible to compare a blood vessel density range of a normal tissue with the blood vessel density of the target body, and display a comparison result on the display 106. Therefore, when the operator observes the blood oxygen image on the display, he/she can refer to the analysis result to make a more accurate and comprehensive analysis on the target tissue.

In the embodiment of the present application, not only is the blood oxygen image acquired, but also related parameters of blood vessels of the target tissue, including blood vessel density, blood oxygen ratio, etc., are calculated according to the blood oxygen image. Moreover, the fused images obtained by fusing the ultrasonic images and the photoacoustic images, i.e., the first fused image and the second fused image, may also be displayed, such that the operator can carry out a comprehensive observation of the target tissue with reference to the blood oxygen image, the related parameters of the blood vessels, the first fused image and the second fused image, and thus make a comprehensive analysis of the state of the target tissue according to the related parameters of the blood vessels inside and outside the target tissue.

In several embodiments provided in the present application, it is to be understood that the disclosed systems, apparatuses and methods may be implemented in other ways. For example, the apparatus embodiments described above are merely exemplary. For example, the division of the units is only a logic function division. In actual implementation, there may be other division methods, for example, multiple units or components may be combined or integrated into another system, or some features may be omitted or not implemented. In a further aspect, the mutual coupling or direct coupling or communication connection shown or discussed may be indirect coupling or communication connection through some interfaces, apparatuses or units, and may be in electrical, mechanical or other forms.

The units described as separate parts may or may not be physically separated, and the parts displayed as units may or may not be physical units, i.e., may be located in one place or may be distributed over multiple network units. Some or all of the units can be selected according to actual needs to achieve the purpose of solutions of this embodiment.

Additionally, the functional units in the embodiments of the present application may be integrated into one processing unit or may exist as being physically separate, or two or more of the units may be integrated into one unit. The above integrated unit may be implemented in the form of hardware or a software function unit.

If the integrated unit is implemented in the form of a software function unit and sold or used as an independent product, it may be stored in a computer-readable storage medium. Based on such an understanding, the technical solution of the present application essentially, or a part contributing to the prior art, or all or part of the technical solution may be embodied in the form of a software product. The computer software product is stored in a storage medium and comprises several instructions to cause a computer device (which may be a personal computer, a server, a network device, etc.) to perform all or some steps of the method described in the embodiments of the present application. The foregoing storage medium comprises: a USB disk, a removable hard disk, a read-only memory (ROM), a random access memory (RAM), a magnetic disk or an optical disk and other media that can store program codes.

It should be noted that in practical applications, the target body may be a human body, an animal, etc. The target tissue may be the face, spine, heart, uterus, or pelvic floor, etc., or may be other parts of a human tissue, such as the brain, bones, liver, or kidneys, etc. The details are not limited herein.

The above descriptions are merely specific embodiments of the present application, but the scope of protection of the present application is not limited thereto. Any changes or substitutions readily conceivable by those skilled in the art within the technical scope disclosed in the present application shall fall within the scope of protection of the present application. Therefore, the scope of protection of the present application shall be subject to the scope of protection of the claims.

The invention claimed is:

1. An imaging method, comprising:
within a first period, emitting a first laser to a target body;
receiving a first photoacoustic signal returned from the target body;
determining a first photoacoustic image of the target body according to the first photoacoustic signal;
within a second period, emitting a second laser to the target body, wherein the second period does not overlap with the first period;
receiving a second photoacoustic signal returned from the target body, wherein a wavelength of the second laser is different from that of the first laser;
determining a second photoacoustic image of the target body according to the second photoacoustic signal;
determining blood oxygen saturation values of all pixel points corresponding to the target body according to the first photoacoustic image and the second photoacoustic image;
generating a blood oxygen image of the target body according to the blood oxygen saturation values of all pixel points corresponding to the target body;
determining positions of each pixel point of a target tissue in the blood oxygen image to determine an area corresponding to the target tissue in the blood oxygen image; and extending a preset range centered on the area corresponding to the target tissue to a peripheral and then removing the area corresponding to the target tissue, so as to obtain a peripheral area of the target tissue in the blood oxygen image;
determining a first blood oxygen saturation value of the area corresponding to the target tissue and a second blood oxygen saturation value of the peripheral area of the target tissue;
determining a blood oxygen ratio of the first blood oxygen saturation value to the second blood oxygen saturation value;
determining a number of pixel points of blood vessels and a number of all pixel points corresponding to the target body, wherein each pixel point of the blood vessels has a blood oxygen saturation value greater than a threshold value; and
determining a blood vessel density according to the number of pixel points of the blood vessels and the number of all pixel points corresponding to the target body; and
analyzing the target tissue according to the blood vessel density and the blood oxygen ratio to obtain an analysis result of the target tissue.

2. The method of claim 1, further comprising:
displaying the blood oxygen image.

3. The method of claim 1, further comprising:
within the first period, emitting a first ultrasonic wave to the target body;
receiving a first ultrasonic echo returned from the target body to obtain a first ultrasonic echo signal;
determining a first ultrasonic image of the target body according to the first ultrasonic echo signal;
displaying the first ultrasonic image;
within the second period, emitting a second ultrasonic wave to the target body;
receiving a second ultrasonic echo returned from the target body to obtain a second ultrasonic echo signal;
determining a second ultrasonic image of the target body according to the second ultrasonic echo signal; and
displaying the second ultrasonic image.

4. The method of claim 3, further comprising:
fusing the first photoacoustic image and the first ultrasonic image to obtain a first fused image of the target body;
displaying the first fused image;
fusing the second photoacoustic image and the second ultrasonic image to obtain a second fused image of the target body; and
displaying the second fused image.

5. The method of claim 3, further comprising:
determining a first mean value of blood oxygen saturation according to the blood oxygen saturation values of all pixel points corresponding to the target tissue, wherein the first mean value of blood oxygen saturation is an average value of the blood oxygen saturation inside the target tissue, wherein the first blood oxygen saturation value is the first mean value of blood oxygen saturation; and
determining a second mean value of blood oxygen saturation according to the blood oxygen saturation values of all pixel points corresponding to the peripheral area of the target tissue, wherein the second mean value of blood oxygen saturation is an average value of the blood oxygen saturation of the peripheral area of the target tissue, wherein the second blood oxygen saturation value is the second mean value of blood oxygen saturation.

6. The method of claim 5, wherein determining the area corresponding to the target tissue and obtaining the peripheral area of the target tissue in the blood oxygen image comprises:
determining the area corresponding to the target tissue in the first ultrasonic image or the second ultrasonic image by comparing parameter values of the target tissue and other tissues around the target tissue, wherein the parameter values comprise at least one of a grayscale value, a brightness value, a pixel value, and a gradient value; and
determining the area corresponding to the target tissue in the blood oxygen image according to the area corresponding to the target tissue determined in the first ultrasonic image or the second ultrasonic image, and determining an area within the preset range at a periphery of the target tissue determined in the blood oxygen image as the peripheral area of the target tissue in the blood oxygen image.

7. The method of claim 5, wherein determining the area corresponding to the target tissue and obtaining the peripheral area of the target tissue in the blood oxygen image comprises:

receiving an input parameter for the first ultrasonic image or the second ultrasonic image;

determining the area corresponding to the target tissue in the first ultrasonic image or the second ultrasonic image according to the input parameter; and determining the area corresponding to the target tissue in the blood oxygen image according to the area corresponding to the target tissue determined in the first ultrasonic image or the second ultrasonic image, and determining an area within the preset range at a periphery of the target tissue determined in the blood oxygen image as the peripheral area of the target tissue in the blood oxygen image.

8. An imaging system, comprising: a laser device, a probe, a transmitting circuit, a receiving circuit, and a processor, wherein the laser device is configured to generate, within a first period, a first laser for irradiating a target body, wherein the first laser is coupled to the probe through an optical fiber bundle and emitted to the target body through the optical fiber bundle;

the receiving circuit is configured to control the probe to receive a first photoacoustic signal returned from the target body;

the processor is configured to determine a first photoacoustic image of the target body according to the first photoacoustic signal;

the laser device is further configured to generate, within a second period, a second laser for irradiating the target body, wherein the second laser is coupled to the probe through the optical fiber bundle and emitted to the target body through the optical fiber bundle, and the second period does not overlap with the first period;

the receiving circuit is further configured to control the probe to receive a second photoacoustic signal returned from the target body;

the processor is further configured to determine a second photoacoustic image of the target body according to the second photoacoustic signal;

the processor is further configured to determine blood oxygen saturation values of all pixel points corresponding to the target body according to the first photoacoustic image and the second photoacoustic image; and generate a blood oxygen image of the target body according to the blood oxygen saturation values of all pixel points corresponding to the target body; and the processor is further configured to:

determine positions of each pixel point of a target tissue in the blood oxygen image to determine an area corresponding to the target tissue in the blood oxygen image; and extend a preset range centered on the area corresponding to the target tissue to a peripheral and then remove the area corresponding to the target tissue, so as to obtain a peripheral area of the target tissue in the blood oxygen image;

determine a first blood oxygen saturation value of the area corresponding to the target tissue and a second blood oxygen saturation value of the peripheral area of the target tissue; and determine a blood oxygen ratio of the first blood oxygen saturation value to the second blood oxygen saturation value; and the processor is further configured to:

determine a number of pixel points of blood vessels and a number of all pixel points corresponding to the target body, wherein each pixel point of the blood vessels has a blood oxygen saturation value greater than a threshold value; and determine a blood vessel density according to the number of pixel points of the blood vessels and the number of all pixel points corresponding to the target body; and analyze the target tissue according to the blood vessel density and the blood oxygen ratio to obtain an analysis result of the target tissue.

9. The imaging system of claim 8, further comprising:

a display configured to display the blood oxygen image.

10. The imaging system of claim 9, wherein the probe is further configured to, within the first period, emit a first ultrasonic wave to the target body, the receiving circuit is further configured to control the probe to receive a first ultrasonic echo returned from the target body to obtain a first ultrasonic echo signal;

the processor is further configured to determine a first ultrasonic image of the target body according to the first ultrasonic echo signal;

the display is further configured to display the first ultrasonic image;

the probe is further configured to, within the second period, emit a second ultrasonic wave to the target body, the receiving circuit is further configured to control the probe to receive a second ultrasonic echo returned from the target body to obtain a second ultrasonic echo signal;

the processor is further configured to determine a second ultrasonic image of the target body according to the second ultrasonic echo signal; and the display is further configured to display the second ultrasonic image.

11. The imaging system of claim 10, wherein the processor is further configured to fuse the first photoacoustic image and the first ultrasonic image to obtain a first fused image of the target body;

the display is further configured to display the first fused image;

the processor is further configured to fuse the second photoacoustic image and the second ultrasonic image to obtain a second fused image of the target body; and the display is further configured to display the second fused image.

12. The imaging system of claim 10, wherein the processor is further configured to:

determine a first mean value of blood oxygen saturation according to the blood oxygen saturation values of all pixel points corresponding to the target tissue, wherein the first mean value of blood oxygen saturation is an average value of the blood oxygen saturation inside the target tissue, wherein the first blood oxygen saturation value is the first mean value of blood oxygen saturation; and determine a second mean value of blood oxygen saturation according to the blood oxygen saturation values of all pixel points corresponding to the peripheral area of the target tissue, wherein the second mean value of blood oxygen saturation is an average value of the blood oxygen saturation of the peripheral area of the target tissue, wherein the second blood oxygen saturation value is the second mean value of blood oxygen saturation.

13. The imaging system of claim 12, wherein the processor is configured to:
- determine the area corresponding to the target tissue in the first ultrasonic image or the second ultrasonic image by comparing parameter values of the target tissue and other tissues around the target tissue, wherein the parameter values comprise at least one of a grayscale value, a brightness value, a pixel value, and a gradient value; and
- determine the area corresponding to the target tissue in the blood oxygen image according to the area corresponding to the target tissue determined in the first ultrasonic image or the second ultrasonic image, and determining an area within the preset range at a periphery of the target tissue determined in the blood oxygen image as the peripheral area of the target tissue in the blood oxygen image.

14. The imaging system of claim 12, wherein the processor is configured to:
- receive an input parameter for the first ultrasonic image or the second ultrasonic image;
- determine the area corresponding to the target tissue in the first ultrasonic image or the second ultrasonic image according to the input parameter; and
- determine the area corresponding to the target tissue in the blood oxygen image according to the area corresponding to the target tissue determined in the first ultrasonic image or the second ultrasonic image, and determining an area within the preset range at a periphery of the target tissue determined in the blood oxygen image as the peripheral area of the target tissue in the blood oxygen image.

* * * * *